(12) United States Patent
Wichlacz et al.

(10) Patent No.: US 7,864,496 B2
(45) Date of Patent: Jan. 4, 2011

(54) LOAD DUMP PROTECTION FOR POWER FET DEVICE

(75) Inventors: John T. Wichlacz, Davison, MI (US);
Andi Gega, Royal Oak, MI (US); W. David Williams, Waterford, MI (US)

(73) Assignee: Magna Electronics, Holly, MI (US)

( * ) Notice: Subject to any disclaimer, the term of this patent is extended or adjusted under 35 U.S.C. 154(b) by 407 days.

(21) Appl. No.: 11/949,369

(22) Filed: Dec. 3, 2007

(65) Prior Publication Data
US 2008/0130178 A1  Jun. 5, 2008

Related U.S. Application Data

(60) Provisional application No. 60/872,681, filed on Dec. 4, 2006.

(51) Int. Cl.
*H02H 3/22* (2006.01)
(52) U.S. Cl. .................... 361/91.1; 361/111
(58) Field of Classification Search ............ 361/56, 361/91.1
See application file for complete search history.

(56) References Cited

U.S. PATENT DOCUMENTS

| | | | |
|---|---|---|---|
| 4,002,959 A | 1/1977 | Schadlich et al. | |
| 4,044,295 A * | 8/1977 | Ferraiolo et al. | 363/54 |
| 4,389,990 A | 6/1983 | Murray | |
| 4,418,298 A | 11/1983 | Suzuki et al. | |
| 4,427,931 A | 1/1984 | Tsukihashi | |
| 4,481,448 A | 11/1984 | Bishop | |
| 4,511,829 A | 4/1985 | Wisniewski | |
| 4,523,134 A | 6/1985 | Kinoshita et al. | |
| 4,562,393 A | 12/1985 | Loyzim et al. | |
| 4,583,028 A | 4/1986 | Angersbach et al. | |
| 4,626,962 A | 12/1986 | Ahn et al. | |
| 4,665,350 A | 5/1987 | Angi et al. | |
| 4,749,922 A | 6/1988 | Hoppe et al. | |
| 4,803,410 A | 2/1989 | Shinohara et al. | |
| 4,893,067 A | 1/1990 | Bhagwat et al. | |
| 4,893,215 A | 1/1990 | Urushiwara et al. | |
| 4,899,256 A | 2/1990 | Sway-Tin | |
| 4,999,556 A | 3/1991 | Masters | |
| 5,070,267 A | 12/1991 | Sano et al. | |
| 5,119,265 A * | 6/1992 | Qualich et al. | 361/103 |
| 5,230,035 A | 7/1993 | Spring | |
| 5,285,146 A | 2/1994 | Pierret et al. | |
| 5,329,238 A | 7/1994 | Hofsass et al. | |
| 5,363,024 A | 11/1994 | Hiratsuka et al. | |
| 5,521,785 A | 5/1996 | Schmidt et al. | |
| 5,594,307 A | 1/1997 | Adachi et al. | |
| 5,747,956 A | 5/1998 | Lamm | |
| 5,781,385 A | 7/1998 | Permuy | |
| 5,799,869 A | 9/1998 | Pichotta | |
| 5,917,296 A | 6/1999 | Frey et al. | |

(Continued)

*Primary Examiner*—Stephen W Jackson
*Assistant Examiner*—Tien Mai
(74) *Attorney, Agent, or Firm*—Van Dyke, Gardner, Linn & Burkhart, LLP

(57) ABSTRACT

A load dump protection system is operable to provide protection for power transistors used to drive a blower motor of a vehicle. The load dump protection system includes circuitry for detecting an over-voltage transient. The circuitry adjusts a drive transistor into a saturation mode in response to a detection of an over-voltage transient. The circuitry lowers the power dissipated by the drive transistor when the drive transistor is in the saturation mode.

8 Claims, 13 Drawing Sheets

U.S. PATENT DOCUMENTS

| | | |
|---|---|---|
| 5,988,517 A | 11/1999 | Bauer et al. |
| 6,018,234 A | 1/2000 | de Savasse |
| 6,054,198 A | 4/2000 | Bunyan et al. |
| 6,064,931 A | 5/2000 | Sawada et al. |
| 6,175,791 B1 | 1/2001 | Oouchi |
| 6,180,880 B1 | 1/2001 | Loibl et al. |
| 6,201,366 B1 | 3/2001 | Menegoli |
| 6,281,827 B1 | 8/2001 | Hsieh |
| 6,329,785 B1 | 12/2001 | Starkie et al. |
| 6,404,607 B1 | 6/2002 | Burgess et al. |
| 6,587,338 B2 | 7/2003 | LaCroix et al. |
| 6,871,126 B2 | 3/2005 | Gorman et al. |
| 6,927,549 B2 | 8/2005 | Ashiya et al. |
| 7,065,435 B2 | 6/2006 | Gorman et al. |
| 2002/0066281 A1 | 6/2002 | Gunasekera |
| 2002/0150478 A1 | 10/2002 | Aoki |
| 2003/0057899 A1 | 3/2003 | LaCroix |
| 2003/0063900 A1 | 4/2003 | Wang et al. |
| 2003/0090919 A1* | 5/2003 | Merceron et al. ........... 363/145 |
| 2003/0123224 A1 | 7/2003 | LaCroix et al. |
| 2003/0204292 A1 | 10/2003 | Wang et al. |

\* cited by examiner

LOAD DUMP PROTECTION FOR POWER FET DEVICE

CROSS REFERENCE TO RELATED APPLICATION

The present application claims benefit of U.S. provisional application Ser. No. 60/872,681, filed Dec. 4, 2006, which is hereby incorporated herein by reference in its entirety.

FIELD OF INVENTION

The present invention relates generally to field effect transistors (FET) devices for motor drivers.

BACKGROUND

Variable blower controllers, or linear power modules, are devices that use power transistors operating in their linear region to achieve a variable DC voltage across a motor. As a result of operating in a linear manner, the transistors dissipate significant power and produce heat. The heat is removed from the system using a heat sink which is typically placed directly into the air stream of the vehicle HVAC system.

The energy of a large voltage transient will increase the power dissipated by the transistor as the voltage across the transistor and the current through it increase. As a result, the temperature of the transistor will rise. In the event of multiple transients, or a single significantly large and long duration transient, it is possible for the transistor maximum temperature rating to be exceeded. The result in this case can be an inoperable or improperly operating device.

Why not shut the transistor off? If one can shut the transistor off during the transient event, the instantaneous power dissipated by the transistor will be zero, but another problem then typically arises. As the transistor is turned off, the inductive load still tries to push current through the transistor, hence a voltage build up will be seen across the transistor terminals. Depending on the size of the inductive load, the voltage build up across the transistor terminals can exceed the device rating, and thus may damage the device.

SUMMARY OF INVENTION

The present invention provides a new discrete circuit to provide protection for power transistors used to drive DC motors in a linear fashion. The present invention employs a circuit to detect an over-voltage transient, such as a vehicle alternator load dump, and forces or adjusts the drive transistor into saturation or a full-on state, thus lowering the power dissipated by the power transistor.

A discrete circuit that is capable of detecting an atypically large voltage at the battery connection is used to force or adjust the power transistor to a full on condition. If a large voltage transient is detected, a "sense circuit" will inform a "transistor drive circuit" of the event. If the inductive load is running during the transient event (i.e., the transistor is operating in a linear mode), the transistor drive circuit will turn the transistor full on, thus decreasing the transistor power dissipation. If the inductive load was off before the voltage transient event occurs, the transistor drive circuit will keep the transistor off.

DESCRIPTION OF THE PREFERRED EMBODIMENTS

Figure 1:
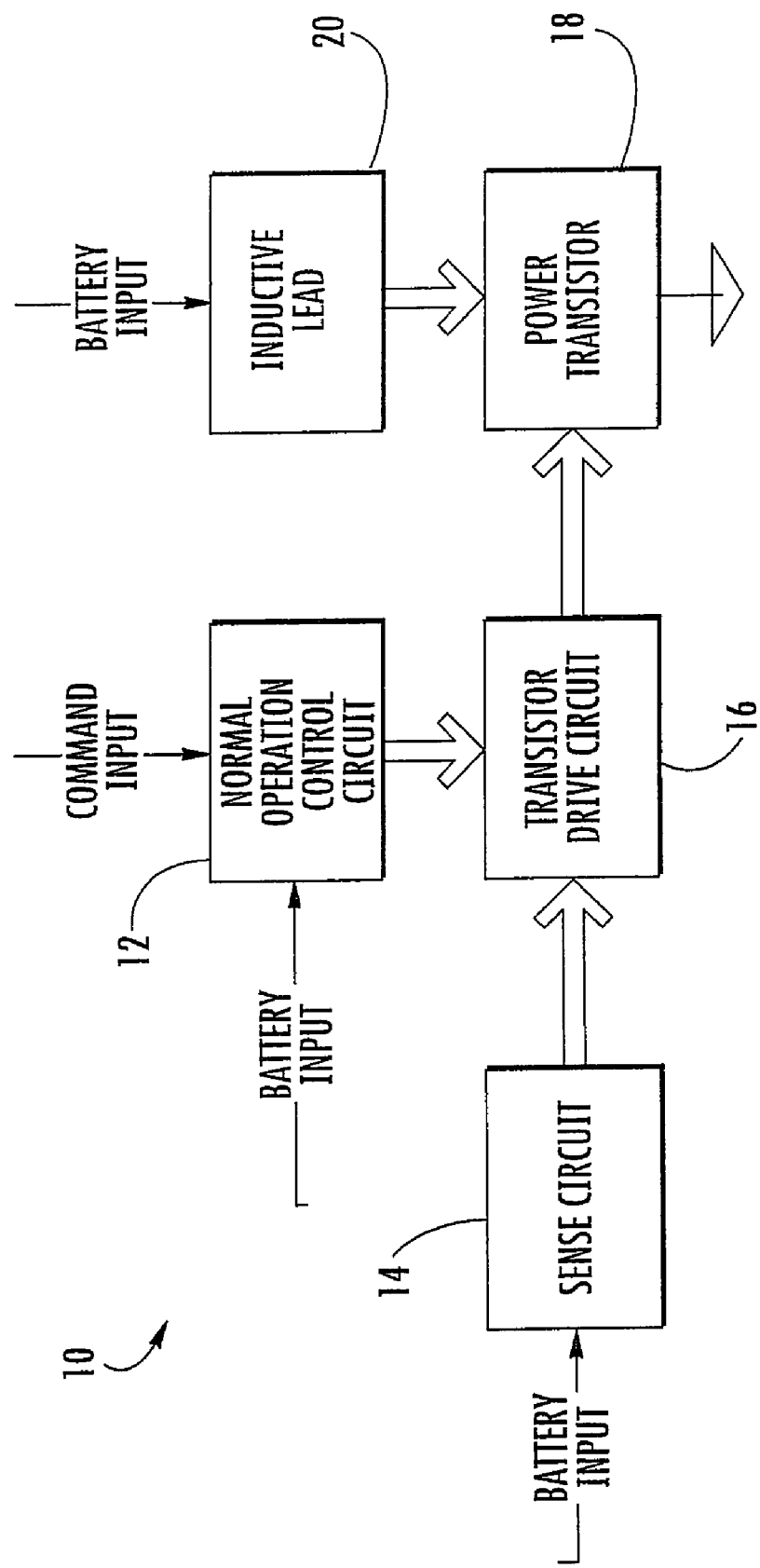
FIG. 1 is a block diagram of a system of the present invention.
Figure 2A:
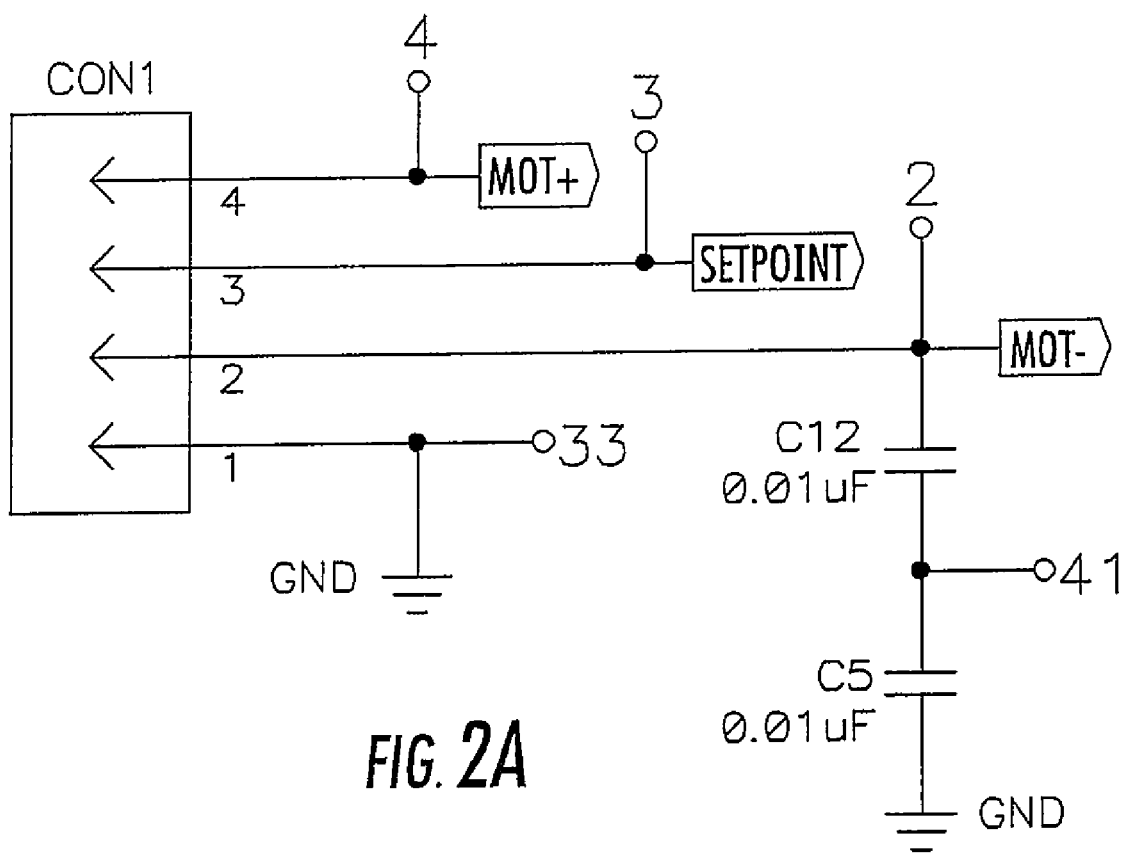
FIGS. 2A-J are schematics of a circuit incorporating the load dump protection of the present invention.
Figure 2B:
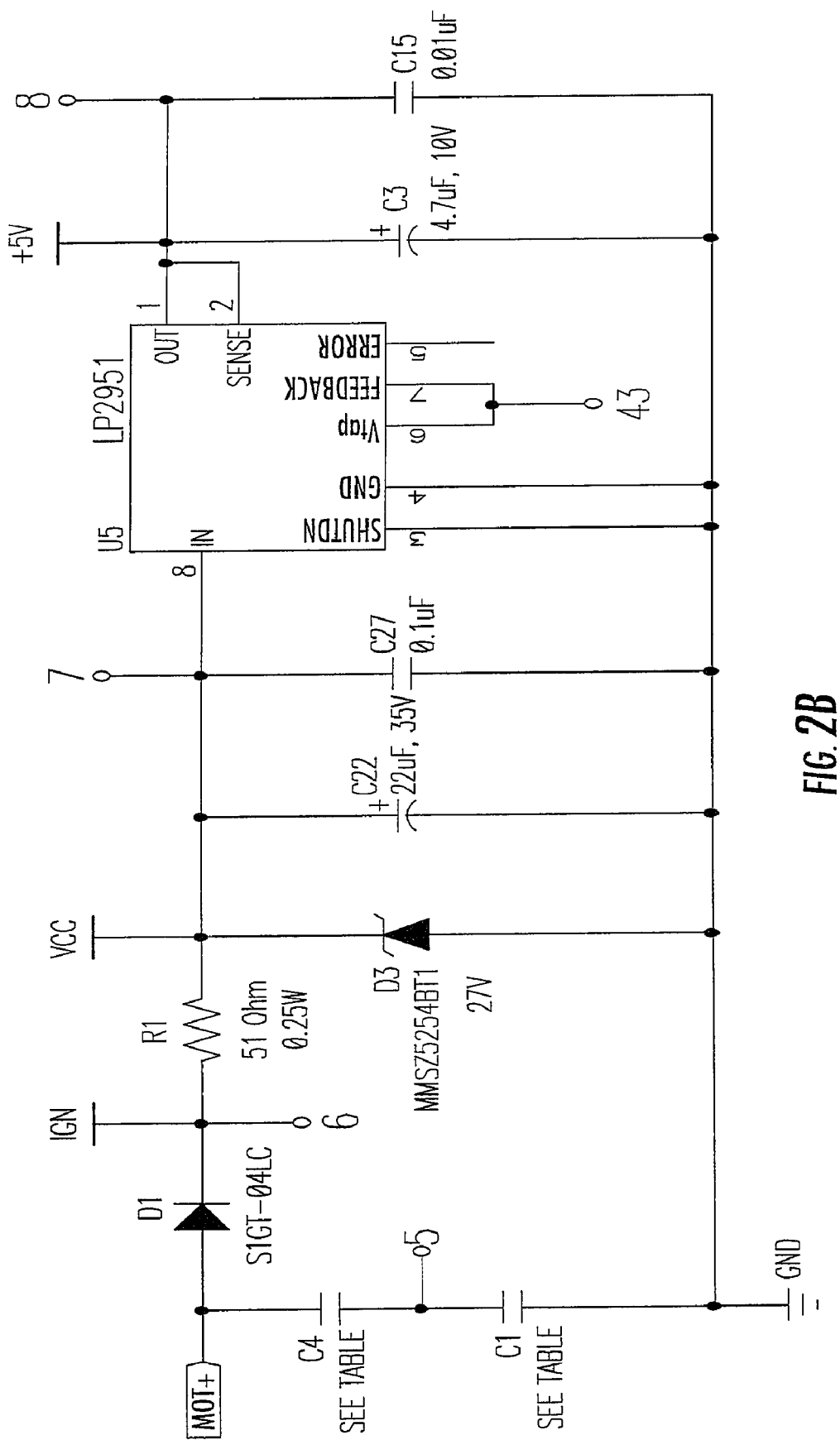
Figure 2C:
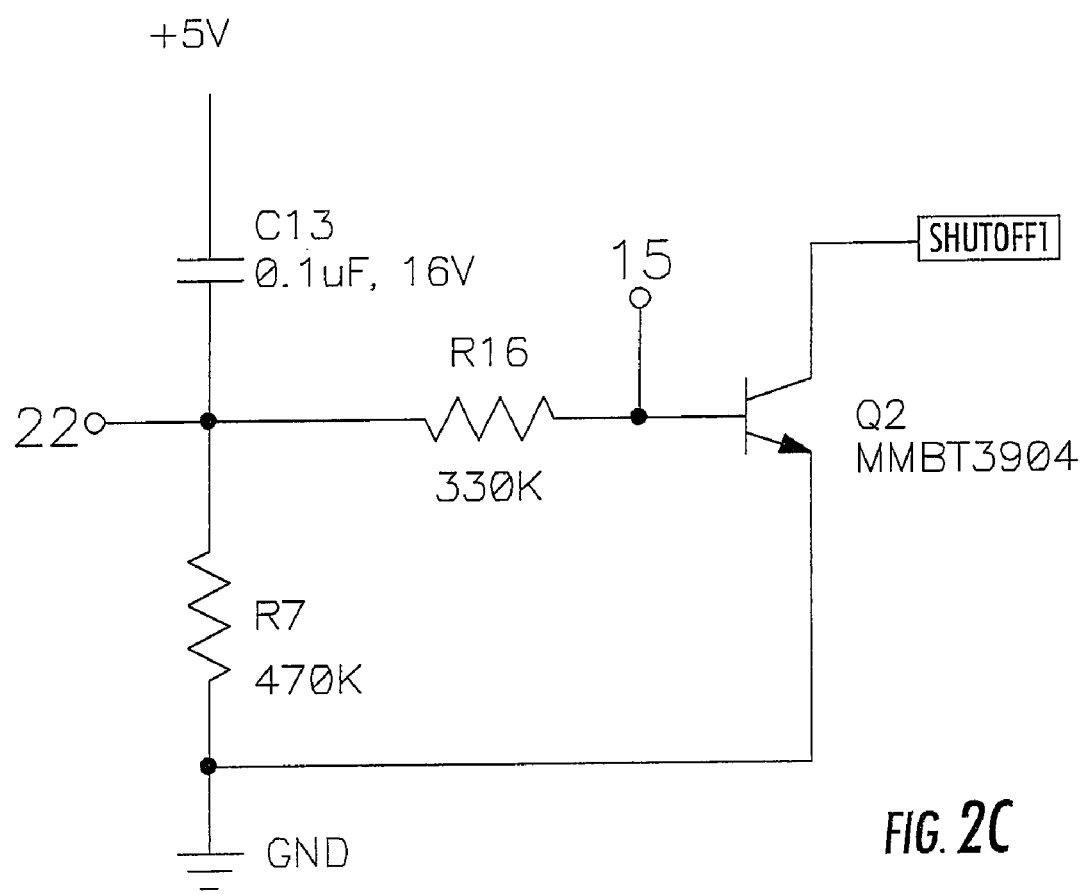
Figure 2D:
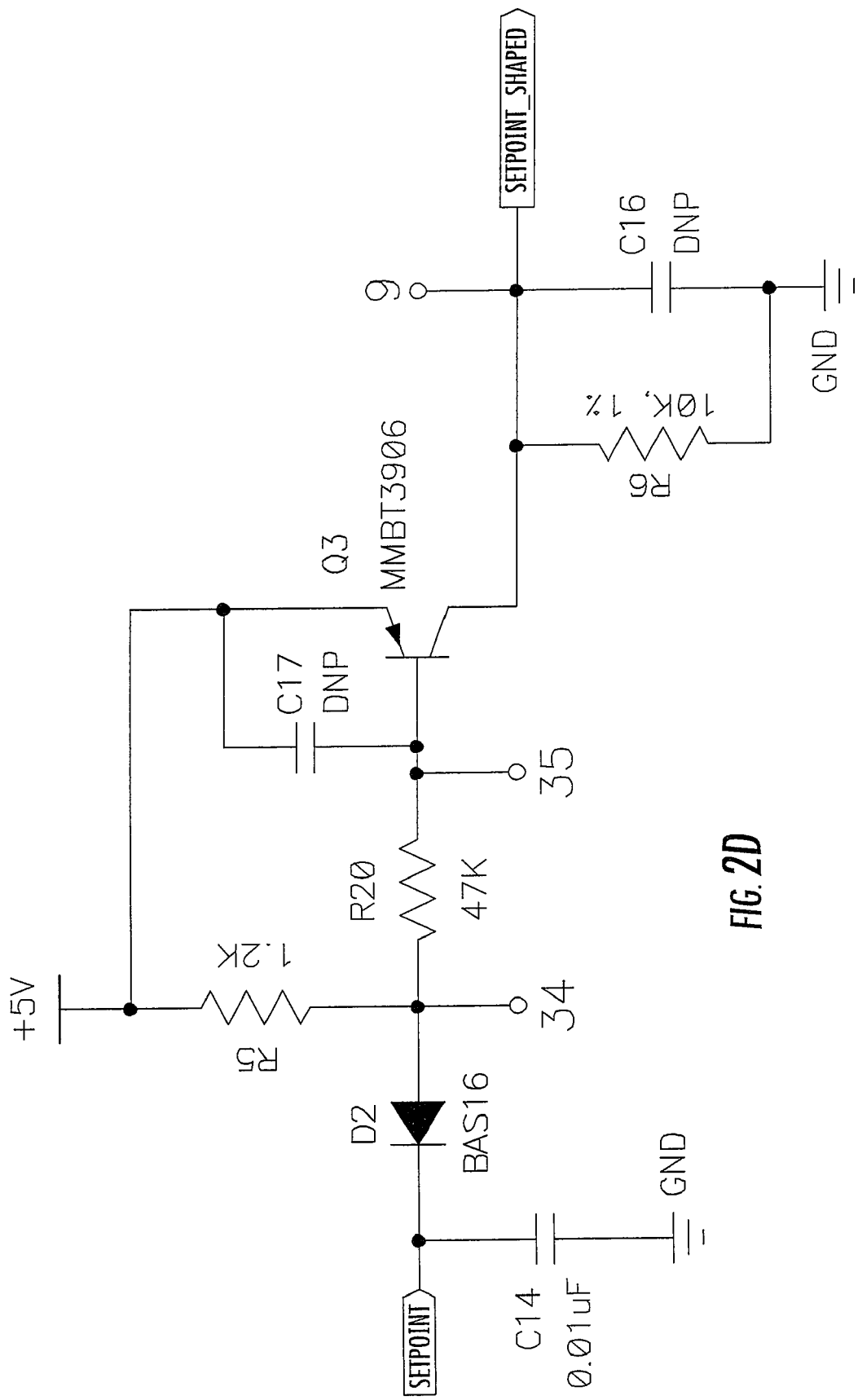
Figure 2E:
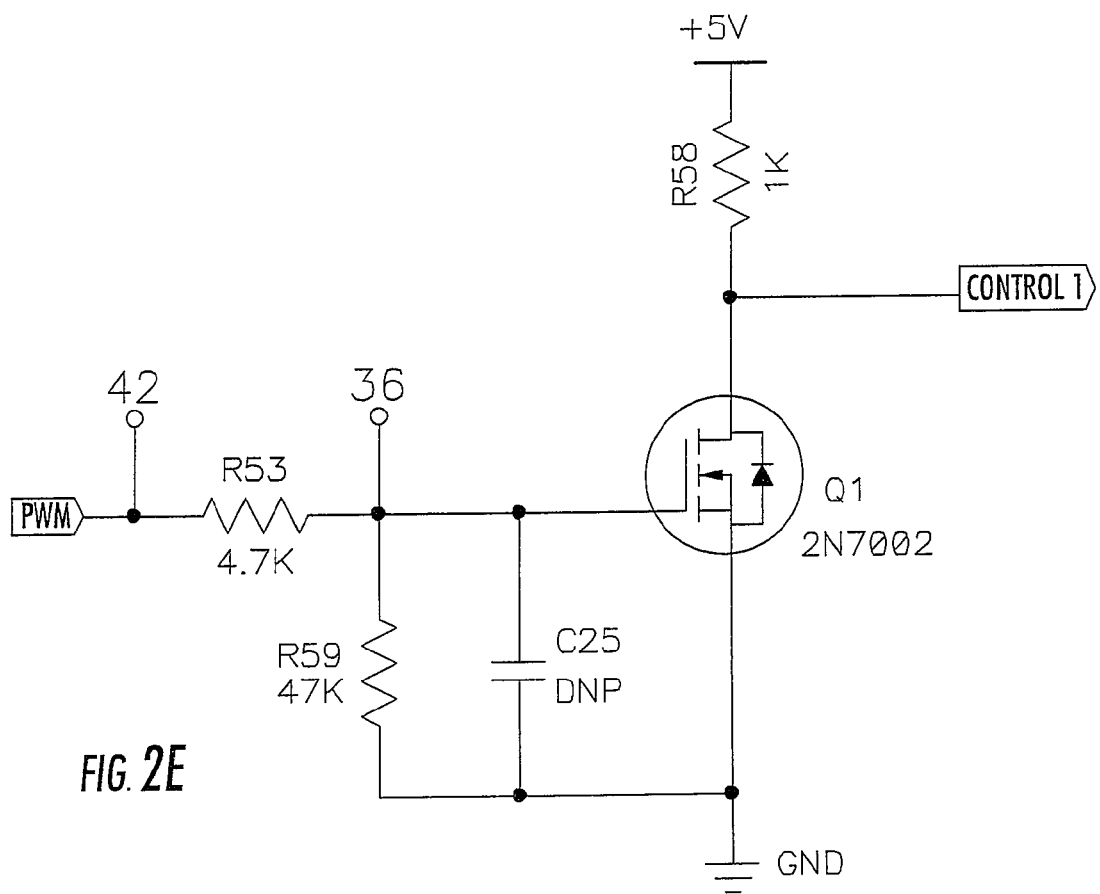
Figure 2F:
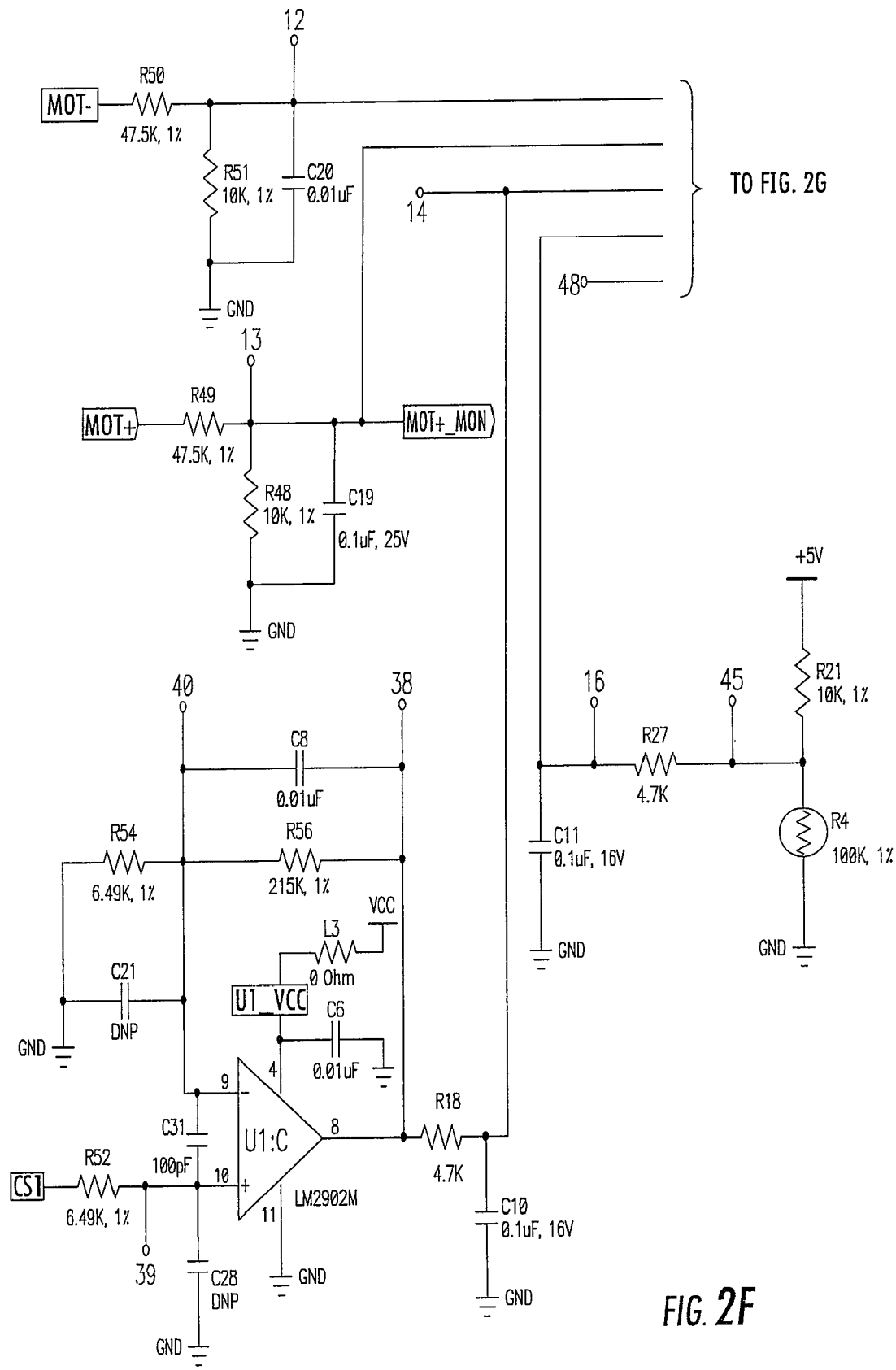
Figure 2G:
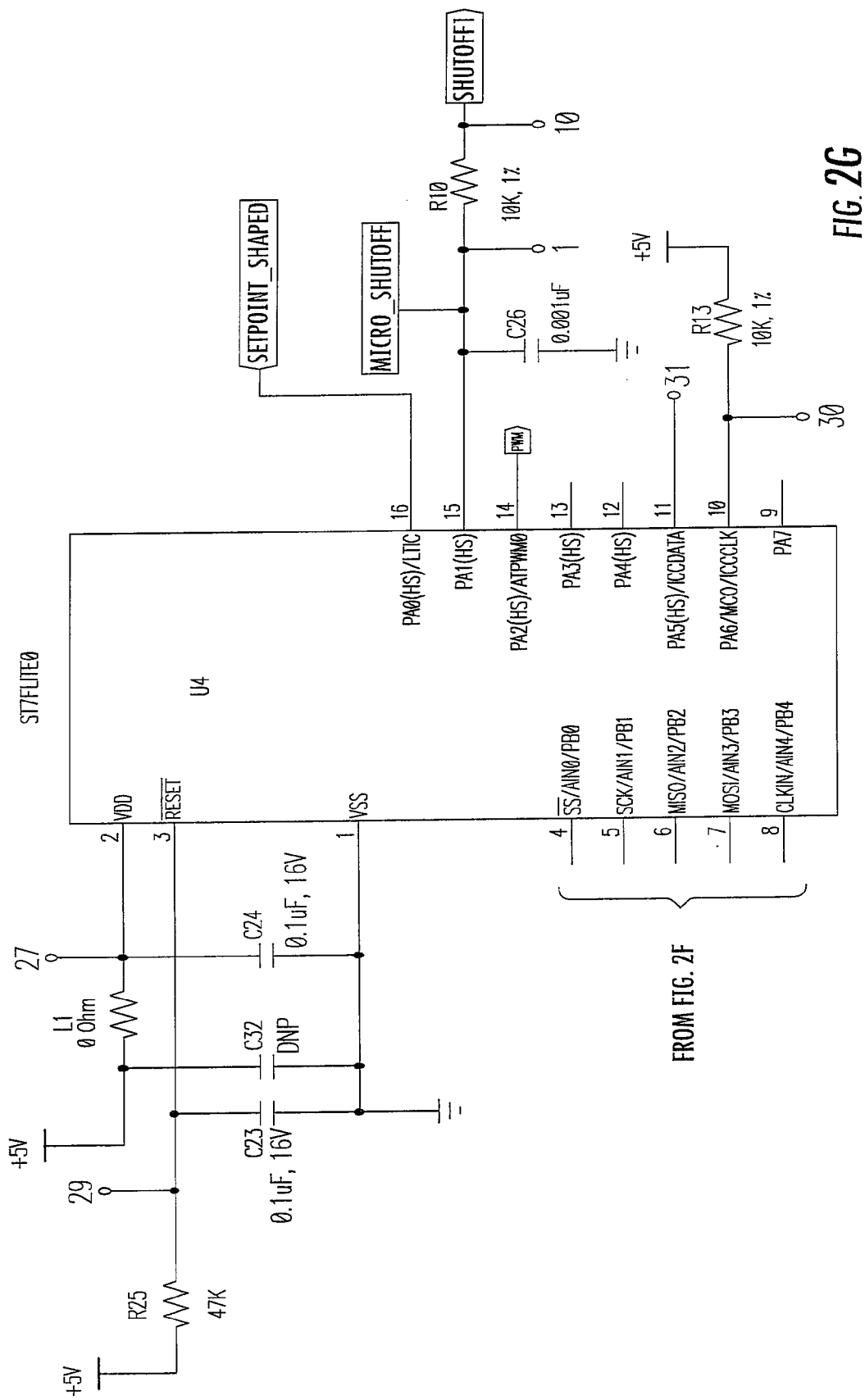
Figure 2H:
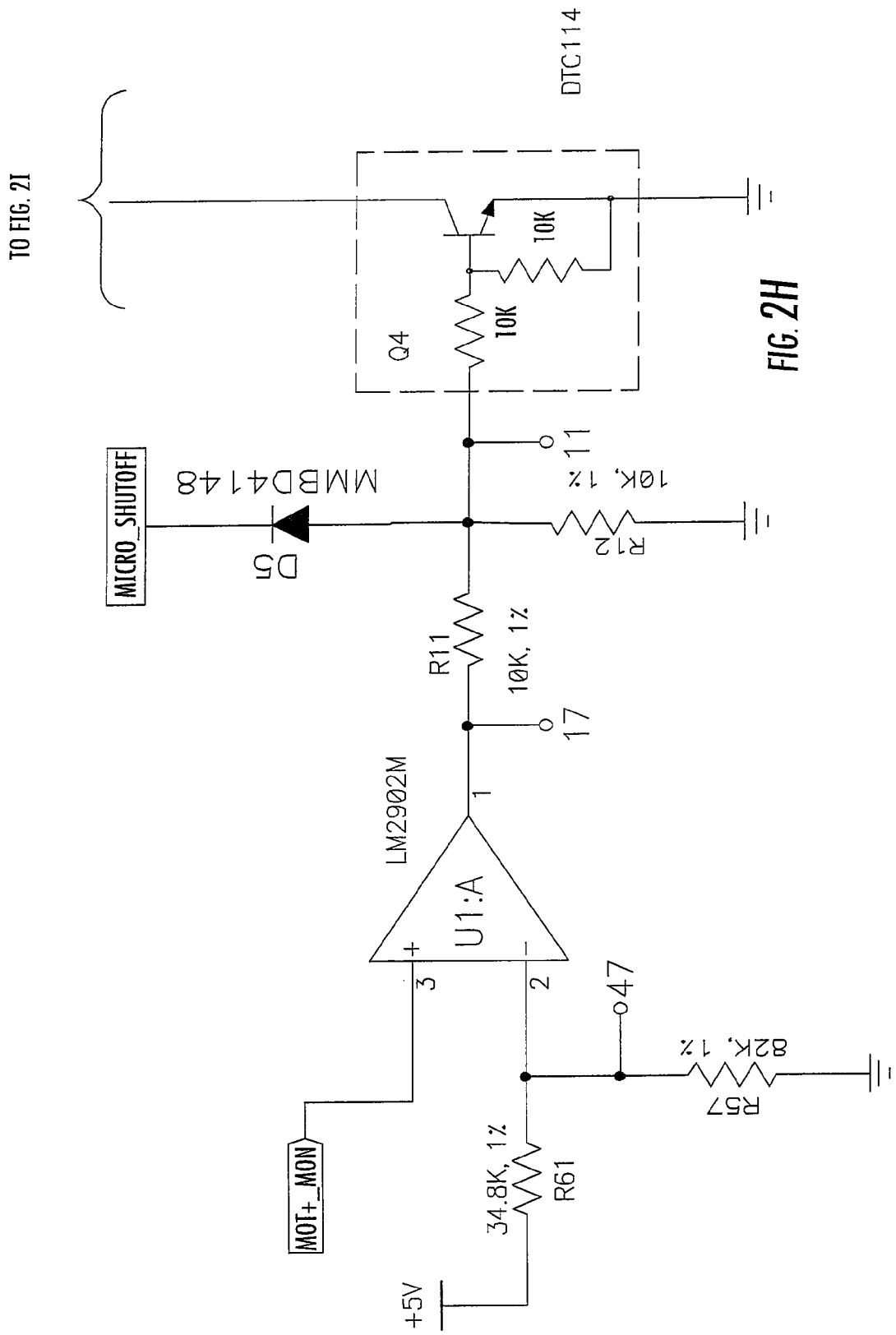
Figure 2I:
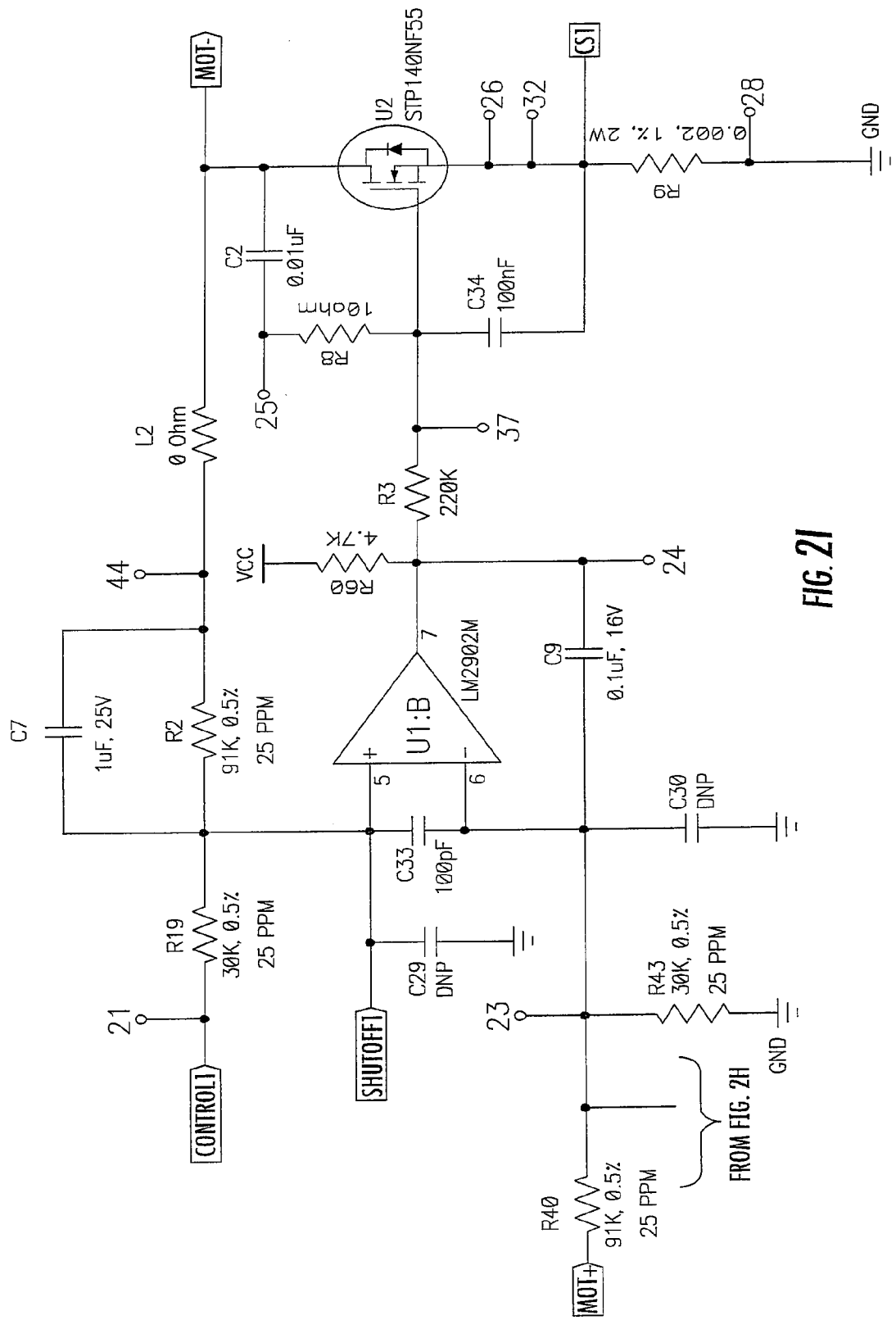
Figure 2J:
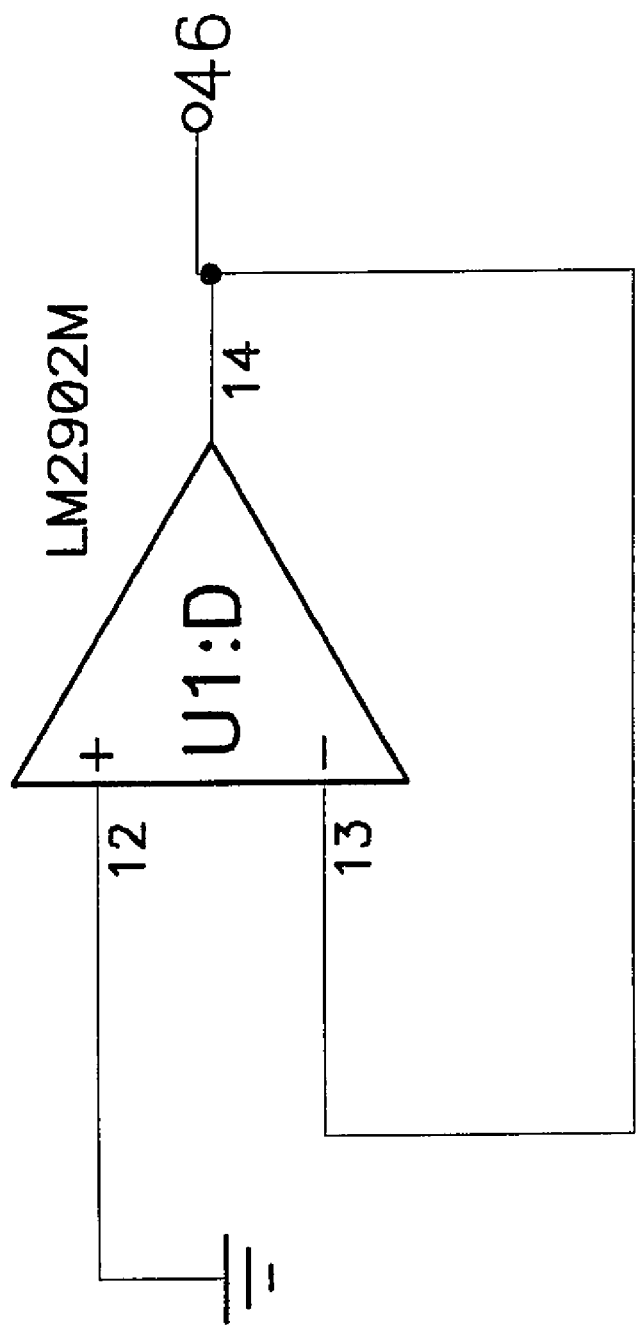

Referring now to the drawings and the illustrative embodiments depicted therein, a load dump protection system is operable to provide protection for power transistors used to drive DC motors (such as blower motors for vehicles) in a linear fashion. The present invention employs a circuit to detect an over-voltage transient, such as a vehicle alternator load dump, and forces or adjusts the drive transistor into saturation or a full-on state, thus lowering the power dissipated by the power transistor.

As shown in FIG. 1, a circuit 10 includes an operation control circuit 12 (such as a typical or known or normal operation control circuit) and a sensing circuit 14, which both control or communicate to a transistor drive circuit 16. The transistor drive circuit 16 controls the power transistor 18, which has an inductive load 20 thereat. The circuit receives power from a power source, such as the vehicle battery or the like.

As shown in FIGS. 2A-J, in a variable blower controller, such as a third generation of variable blower controllers, a spare op-amp gate (U1:A) used as a comparator compares the incoming battery voltage to a high voltage threshold. A value of about 20.5 volts (accomplished by R57 and R61) may be selected as the threshold level, since such a voltage is appreciably higher than the 19 volt maximum operating voltage (however, other threshold levels may be selected while remaining within the spirit and scope of the present invention).

The output of the comparator, when the battery voltage exceeds the threshold level or limit, drives a bipolar (NPN) transistor (Q4) into saturation. The collector of the transistor forces an op-amp circuit (U1:B and surrounding circuit) to apply a maximum voltage to the base of the power FET (U2) to force the power FET fully on. A diode (D5) (or other suitable diode or element) is disposed at the gate of the NPN transistor and allows the microprocessor (U4) (used in this application) to override the circuit and keep the transistor (Q4) off. Other circuitry means or elements may be implemented to provide a path for the microprocessor to override the op-amp circuit, or other circuitry means or elements may be implemented to replace the diode's role and/or the microprocessor's role, while remaining within the spirit and scope of the present invention.

In the illustrated embodiment, the resistors may comprise 0.1 W, 5 percent, 200 ppm resistors, and the capacitors may comprise 50 V, 20 percent capacitors. Test points 33, 27, 29, 30, 31 and 48 may be used for in-circuit programming of microprocessor U4. The microprocessor may comprise any suitable processor while remaining within the spirit and scope of the present invention.

Figure 3:
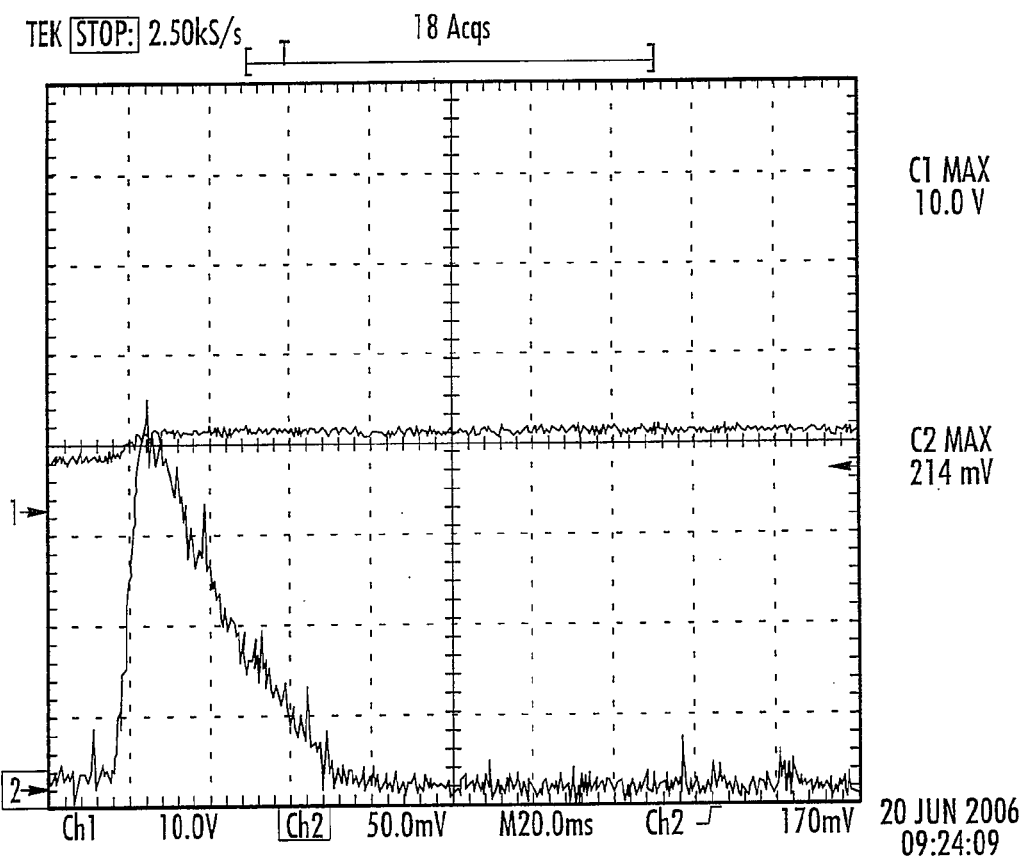
FIG. 3 is a graph showing the detected voltages for a circuit without the load dump protection.
Figure 4:
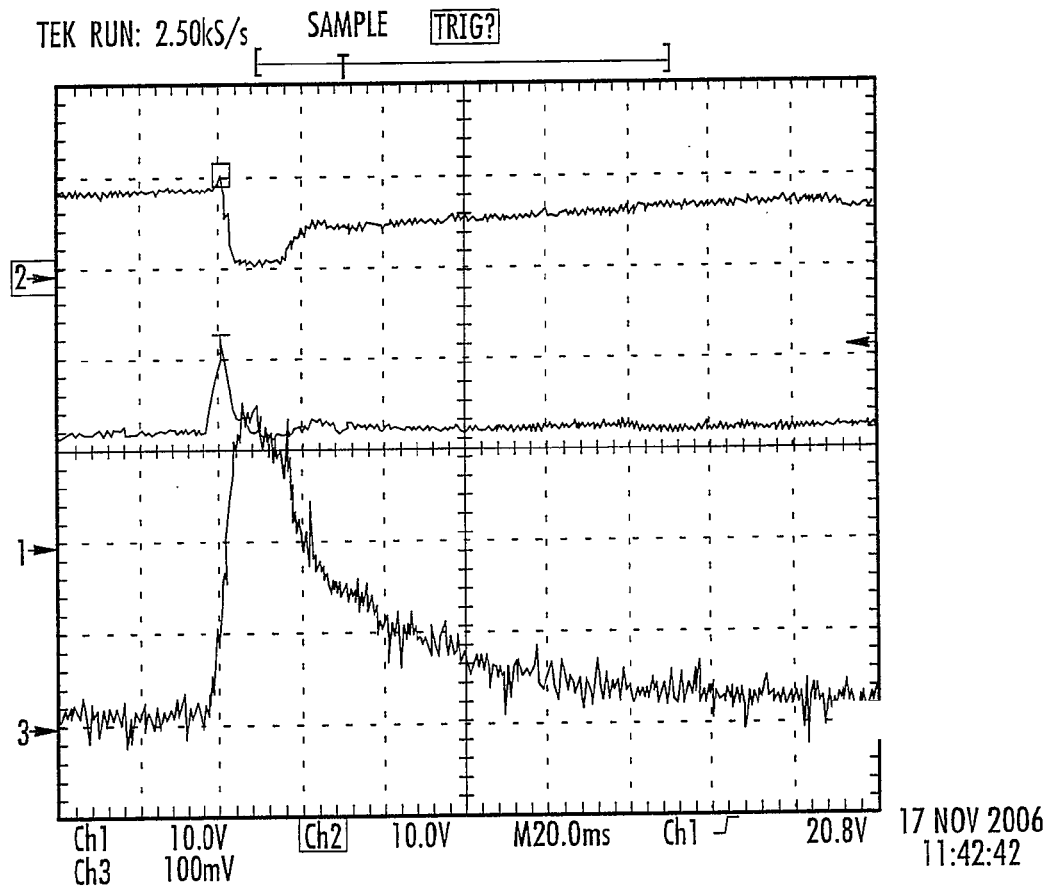
FIG. 4 is a graph showing the detected voltages for a circuit with the load dump protection of the present invention.

During load testing, and as shown in FIGS. 3 and 4, the circuit without the added protection (FIG. 3) is exposed to a maximum power of 550 W, while the circuit with protection (FIG. 4) is exposed to a reduced power maximum of 216 W. Clearly, other power ranges are contemplated while remaining within the spirit and scope of the present invention.

Optionally, the circuit and variable blower controller may utilize aspects of the variable blower controllers described in U.S. Pat. Nos. 7,065,435 and 6,871,126, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A load dump protection system operable to provide protection for a power transistor used to drive a blower motor of a vehicle, said load dump protection system comprising:
    said power transistor connected in series with a load;
    circuitry for detecting an over-voltage transient, said circuitry adjusting a drive transistor into a saturation mode in response to a detection of an over-voltage transient, said circuitry lowering the power dissipated by said drive transistor when said drive transistor is in said saturation mode; and
    wherein said circuitry adjusts an op-amp circuit to turn said power transistor fully on by applying a maximum voltage to a gate of said power transistor in said over-voltage transient condition drive transistor to adjust said drive transistor to said saturation mode.

2. The load dump protection system of claim 1, wherein said circuitry is capable of detecting an atypically large voltage at a battery connection.

3. The load dump protection system of claim 1, wherein said circuitry comprises a sense circuit and a drive circuit, said sense circuit detecting an over-voltage transient and said drive circuit adjusting said drive transistor in response to said sense circuit.

4. The load dump protection system of claim 1, wherein said circuitry adjusts said drive transistor to said saturation mode when said drive transistor is operating, and wherein said circuitry does not adjust said drive transistor to said saturation mode when said drive transistor is not operating.

5. The load dump protection system of claim 4, wherein said circuitry comprises a comparator that compares an incoming battery voltage to a high voltage threshold and said circuitry adjusts said drive transistor to said saturation mode in response to an output of said comparator when the incoming battery voltage is greater than said high voltage threshold.

6. The load dump protection system of claim 5, wherein said circuitry is operable to override said op-amp circuit and maintain said drive transistor in an off mode when said drive transistor is not operating and when the incoming battery voltage is greater than said high voltage threshold.

7. A load dump protection system operable to provide protection for a power transistor used to drive a blower motor of a vehicle, said load dump protection system comprising:
    said power transistor connected in series with a load;
    circuitry for detecting an over-voltage transient, said circuitry adjusting a drive transistor into a saturation mode in response to a detection of an over-voltage transient, said circuitry lowering the power dissipated by the drive transistor when said drive transistor is in said saturation mode; and
    wherein said circuitry comprises a comparator that compares an incoming battery voltage to a high voltage threshold and said circuitry adjusts said drive transistor to said saturation mode in response to an output of said comparator when the incoming battery voltage is greater than said high voltage threshold, and wherein said circuitry adjusts an op-amp circuit to turn said power transistor fully on by applying a maximum voltage to a gate of said power transistor in said over-voltage transient condition.

8. The load dump protection system of claim 7, wherein said circuitry is operable to override said op-amp circuit and maintain said drive transistor in an off mode when said drive transistor is not operating and when the incoming battery voltage is greater than said high voltage threshold.

* * * * *

UNITED STATES PATENT AND TRADEMARK OFFICE
CERTIFICATE OF CORRECTION

| | | |
|---|---|---|
| PATENT NO. | : 7,864,496 B2 | Page 1 of 1 |
| APPLICATION NO. | : 11/949369 | |
| DATED | : January 4, 2011 | |
| INVENTOR(S) | : John T. Wichlacz, Andi Gega and David Williams | |

It is certified that error appears in the above-identified patent and that said Letters Patent is hereby corrected as shown below:

Column 3
Lines 23-24, Claim 1, Delete "drive transistor to adjust said drive transistor to said saturation mode" after "condition"

Signed and Sealed this
Twenty-second Day of November, 2011

David J. Kappos
*Director of the United States Patent and Trademark Office*